(12) United States Patent
Bromley

(10) Patent No.: US 6,408,452 B1
(45) Date of Patent: Jun. 25, 2002

(54) AUTOMATIC SHUT-OFF VALVE

(76) Inventor: Arthur J. Bromley, 15432 SE. 103$^{rd}$ Street Rd., Oklawaha, FL (US) 32179

( * ) Notice: Subject to any disclaimer, the term of this patent is extended or adjusted under 35 U.S.C. 154(b) by 0 days.

(21) Appl. No.: 09/934,397

(22) Filed: Aug. 22, 2001

Related U.S. Application Data

(63) Continuation-in-part of application No. 09/593,939, filed on Jun. 15, 2000, now Pat. No. 6,295,661.
(60) Provisional application No. 60/198,779, filed on Apr. 21, 2000.

(51) Int. Cl.$^7$ ................................................ E04H 4/06
(52) U.S. Cl. ............................... 4/504; 4/507; 137/362; 251/295
(58) Field of Search ........................... 4/496, 504, 507, 4/509, 661; 251/295; 137/362

(56) References Cited

U.S. PATENT DOCUMENTS

| | | | |
|---|---|---|---|
| 2,839,264 A | 6/1958 | Trubert | 251/295 X |
| 3,306,448 A | 2/1967 | Baker | 4/509 X |
| 3,923,081 A | 12/1975 | Persson | 137/217 |
| 4,115,878 A | 9/1978 | Johnson et al. | 4/492 |
| 4,398,557 A | 8/1983 | Dugge | 137/526 X |
| 4,556,084 A | 12/1985 | Frawley | 137/526 |
| 4,658,449 A | 4/1987 | Martin | 4/496 |
| 4,941,503 A | 7/1990 | Hubner, Jr. | 137/526 X |
| 5,273,068 A | 12/1993 | Duren | 137/526 |
| 5,682,624 A | 11/1997 | Ciochetti | 4/509 |
| 5,809,587 A | 9/1998 | Fleischer | 4/504 |

Primary Examiner—Robert M. Fetsuga
(74) Attorney, Agent, or Firm—Paul S. Rooy

(57) ABSTRACT

An automatic shut-off valve for installation on a swimming pool or spa main drain. The automatic shut-off valve has a ball and ball spring between a diaphragm and a housing. The diaphragm is made of resilient material. Downward force on the diaphragm urges the ball into sealable engagement with a valve seat in the housing. During operation, a swimmer covers sufficient diaphragm base apertures so that the diaphragm center is moved downwards as urged by the main drain suction, towards a swimming pool or spa main drain over which the automatic shut-off valve is mounted. The downward motion of the diaphragm urges the ball into sealable engagement with a valve seat in the housing, where it is securely held by the main drain suction. In this fashion, the ball is entrapped instead of the swimmer, thus avoiding possible disembowelment and/or drowning on the part of the swimmer. Back-up shut-off function is provided by a cap spring-loaded into a closed position whence it migrates should the ball become dislodged. An alternate embodiment automatic shut-off valve is disclosed wherein an integral are diaphragm and base replaces the diaphragm/diaphragm base combination of the preferred embodiment.

18 Claims, 6 Drawing Sheets

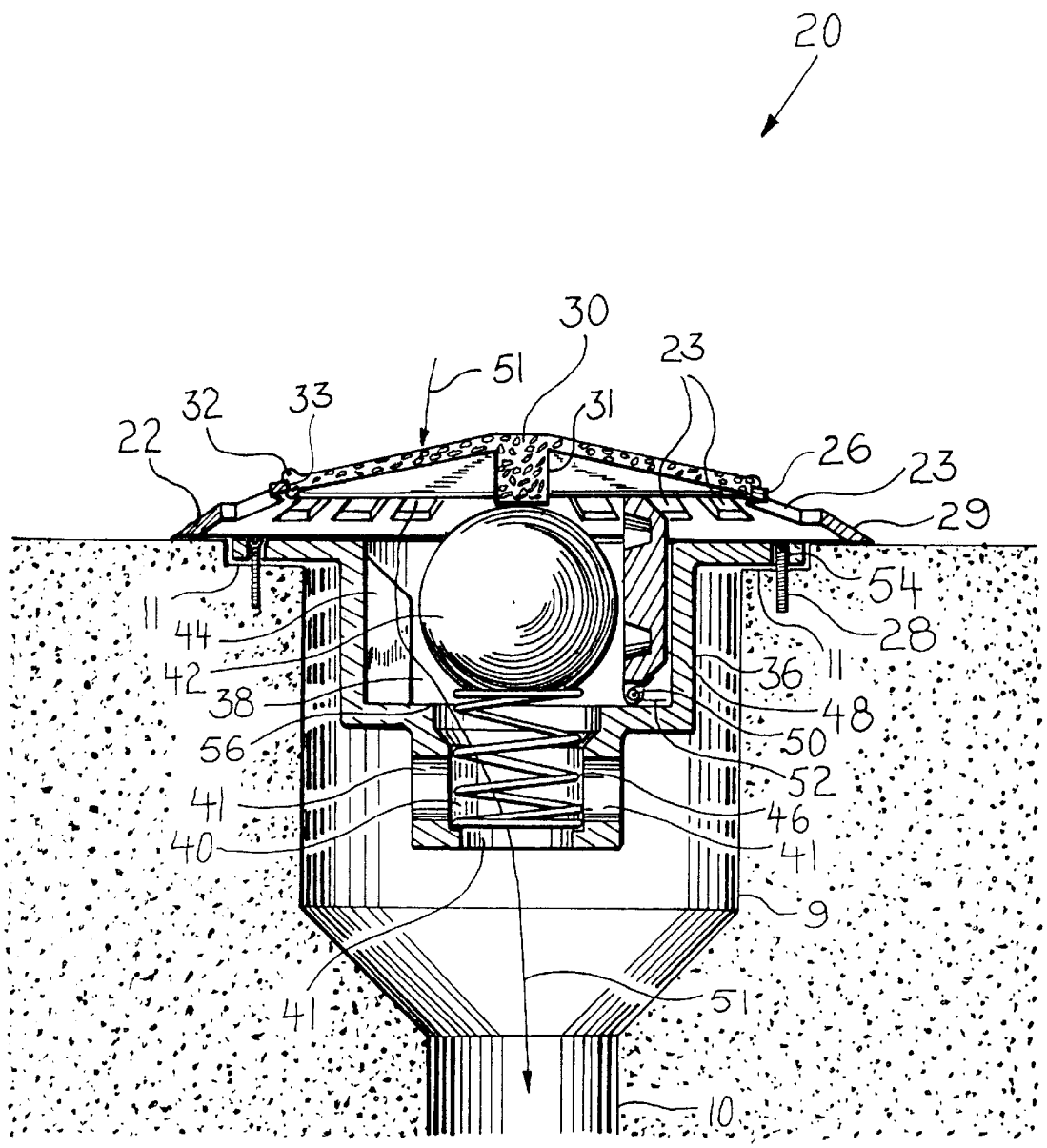

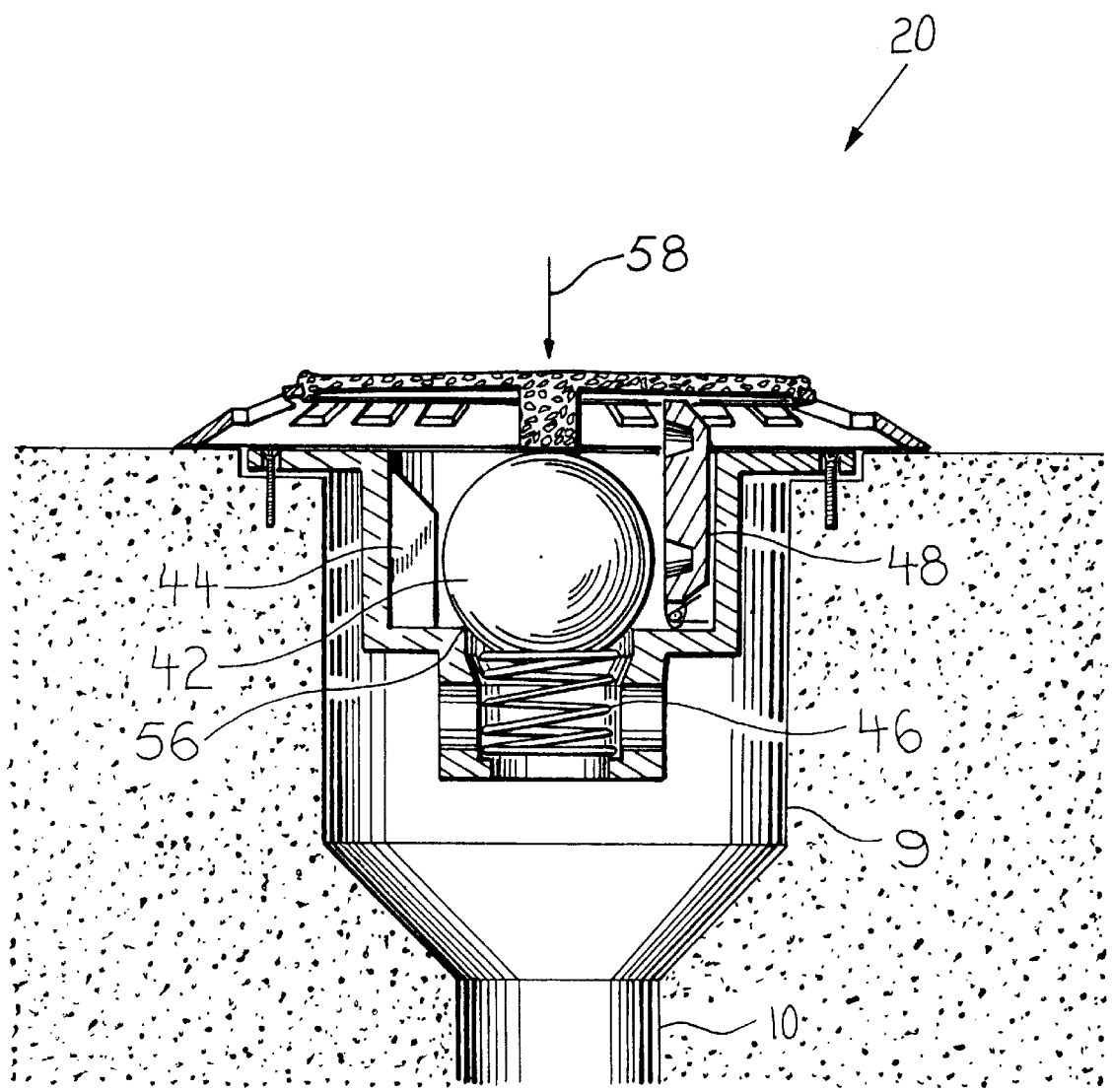

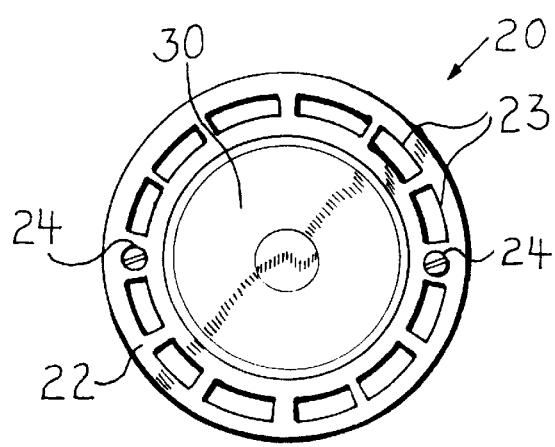
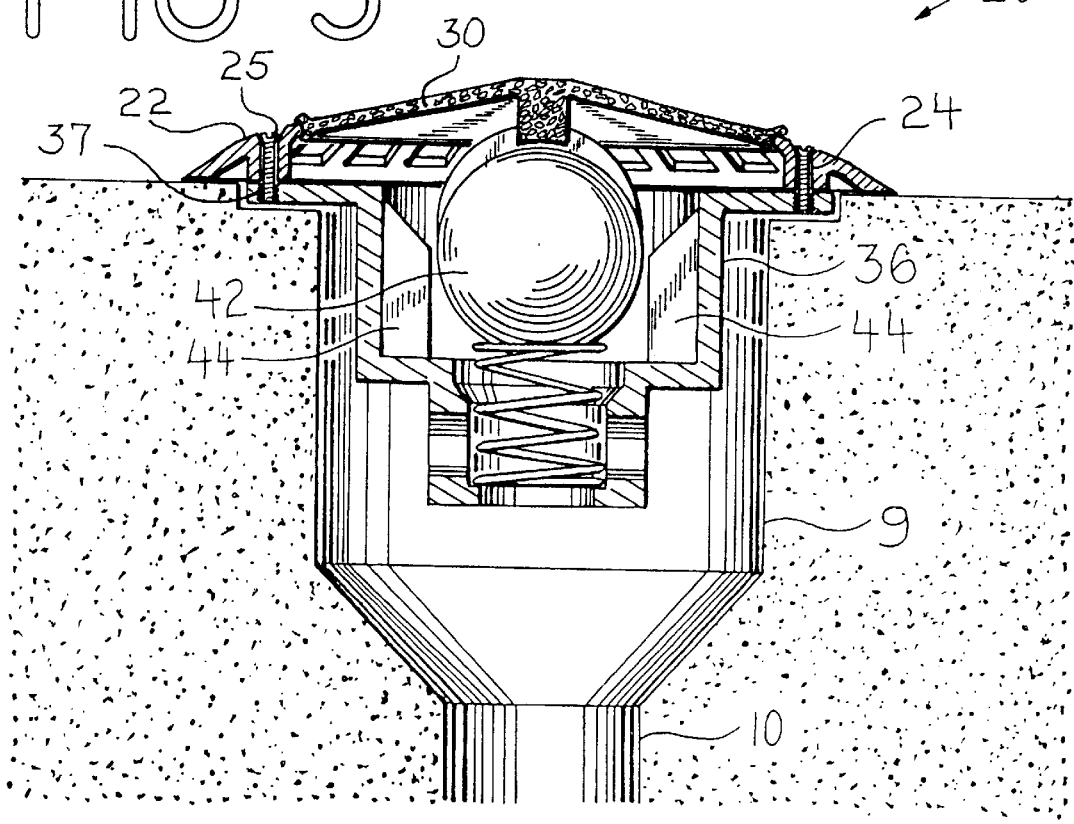

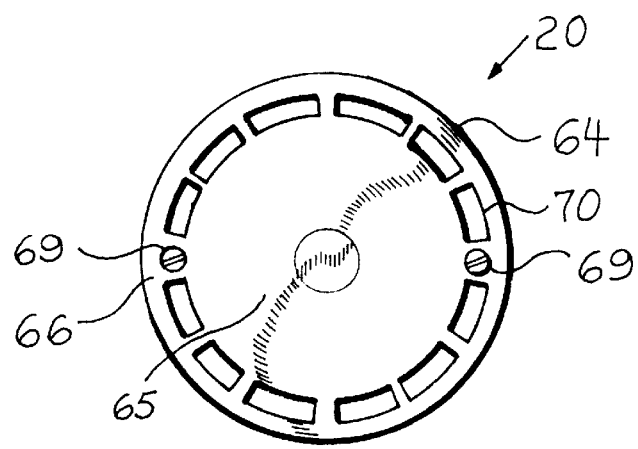
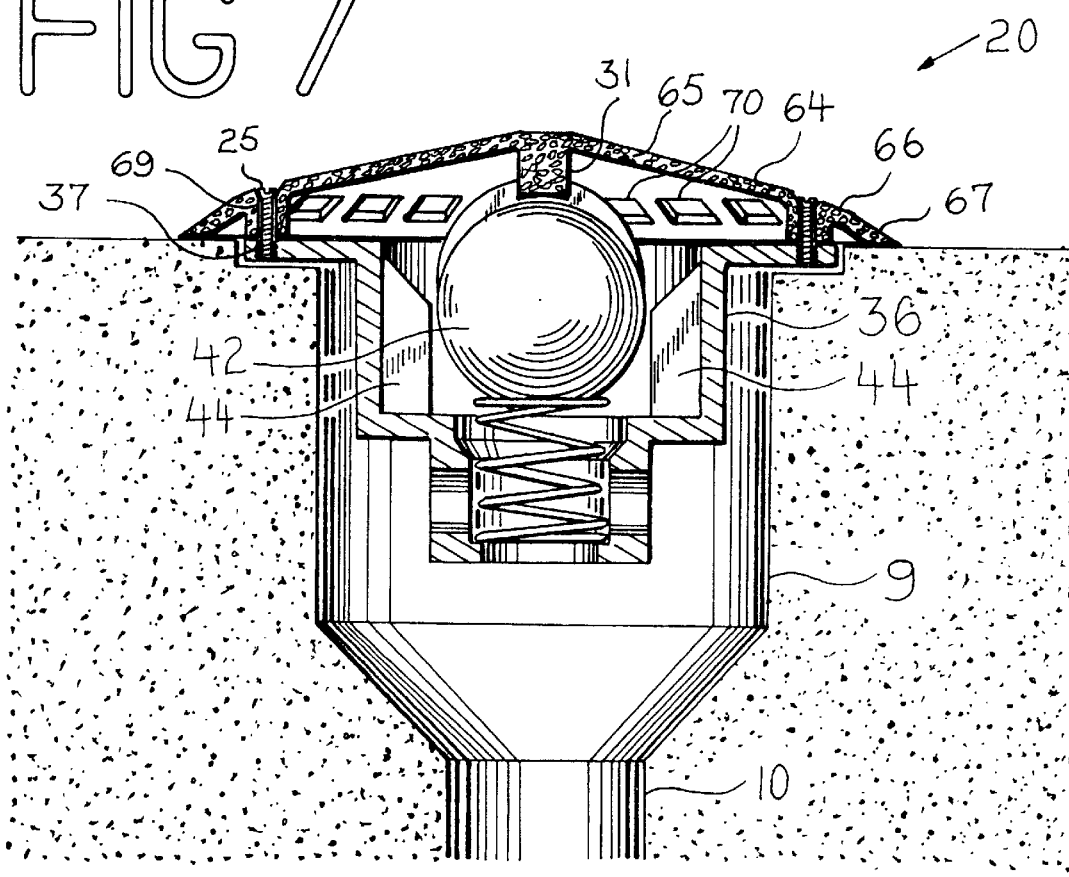

AUTOMATIC SHUT-OFF VALVE

This application is a Continuation In Part of U.S. patent application Ser. 09/593,939 filed Jun. 15, 2000, U.S. Pat. No. 6,295,661, which in turn was based on provisional patent application Ser. No. 60/198,779 filed Apr. 21, 2000, and therefore claims benefit and priority of these prior applications.

BACKGROUND OF THE INVENTION

1. Field of the Invention

This invention relates to valves, and in particular to an emergency shut-off valve for use in swimming pools, spas and hot tubs and the like, to help prevent main drain entrapment.

2. Background of the Invention

Most people are aware of the possibility of drowning associated with water activities. Fences are erected around swimming pools in residential back yards to prevent non-swimming children from wandering into the pool. A less well-known hazard connected with swimming pools and hot tubs is the horrifying possibility of becoming entrapped by the vacuum pulled by the pool or hot tub pump at the main drain. If an individual—typically a child between the ages of 2 and 16—were to sit an a main drain, completely blocking it, disembowelment could occur. Even if the child were to block the main drain with a different body part, thus avoiding disembowelment, entrapment could occur, holding the child underwater. If the pump is not stopped, interrupting the vacuum, the child could drown.

A typical swimming pool main drain circulation system is depicted in FIG. 1. Pool 2 filled with water 4 comprises main drain 6 communicating with sump 9 covered by grate 8. Pump 12 draws water through outflow pipe 10 (the main drain "line"), and pumps it back into pool 2 through inflow pipe 14. A pool filter (not shown) is typically installed on inflow pipe 14 between pump 12 and pool 2. The pool circulation system is used to run pool water through the pool filter to clean water 4, as well as to provide a mixing effect to homogeneously distribute pool water additives such as chlorine, algaecide, acidity/alkalinity pH equalizers, etc.

Between the years 1980 and 1996 fifteen incidents of disembowelment were reported to the U.S. Consumer Product Safety Commission. See *Guidelines for Entrapment Hazards: Making Pools and Spas Safer* pg. 2 (U.S. Government Printing Office 1998). The typical scenario involved children between the ages of 2 and 6 who sit on the uncovered drain of a public wading pool whose cover has been broken or is missing. Id. When the child's buttocks cover the drain, evisceration can occur through the ruptured septum extremely quickly, even where the change of pressure is small. Id. A 2.2 pound vacuum is considered the threshold for evisceration. *Pool and Spa News*, pg. 22 (Apr. 23, 1997). The speed of the disembowelment in itself is frightening—the evidence indicates disembowelment injuries take place in a fraction of a second once the child sits on the drain. *Pool & Spa News—Special Reports* Pg. 7 (1997). Although the disembowelment is not generally fatal, the loss is permanent and irreversible, and has a devastating effect on the victim's future health and happiness. *Guidelines for Entrapment Hazards: Making Pools and Spas Safer* pg. 2 (U.S. Government Printing Office 1998).

Nine cases of body entrapment, including seven which resulted in death, were reported between January 1990 and May 1996. Id. Six of the incidents occurred in spas, two in swimming pools, and one in a wading pool. In one case, a sixteen year old girl was trapped on a 12 in.×12 in. drain grate in a large public spa, and drowned. Id. These entrapment incidents involved primarily children between the ages of 8 and 16.

Still another entrapment scenario involves the victim's hair becoming entrapped in the main drain. At least 30 hair entrapment incidents were reported to the Consumer Product Safety Commission between 1990 and 1998, of which 10 were fatal. Id. at pg. 3. These incidents typically involved long, thin female head hair becoming entangled in the apertures and protrusions around main drain grates. The entrapment occurred because of entanglement, not strong suction forces. Id.

This main drain entrapment and disembowelment problem is viewed to be sufficiently serious to warrant legislative action: currently statutes exist in several states (including California and Ohio) requiring main drains safety features, and legislation is pending in several other states.

Existing Designs

A number of approaches have been taken towards preventing the disembowelment/entrapment problem. One approach has been to mandate at least two drains, so if one of them is obstructed, the other will operate to relieve excessive suction at the obstructed drain. Where only one drain has been installed in an existing pool or hot tub, this approach can be expensive, and may involve tearing up the existing concrete pool deck to install piping. In addition, independent valves for each resultant drain are typically provided. If one of the drain valves is closed, then the safety of the additional drain is defeated. Also, while two working drains may ameliorate the disembowelment problem and the suction entrapment problem, it does little to prevent the hair entrapment problem, which is not caused by suction.

Another approach has been to provide an indication and control system which senses a vacuum rise in the main drain line, and turns off the main drain pump, thus relieving the vacuum at the main drain after a certain time lapse. The presence of an indication and control system which includes a vacuum sensor attached to a switch, which then shuts down the main drain pump, which then after a period of time relieves the vacuum present at the main drain, necessarily involves a certain delay between the time the vacuum increases at the main drain and the time the vacuum is actually relieved at the main drain. If at any time during this inherent system delay the main drain vacuum exceeds the 2.2 pound threshold, permanent and irreversible damage has already been inflicted on the victim in the disembowelment scenario.

While the indication and control pump shut-off switch approach may help release individuals trapped by vacuum at the main drain before they drown, critics question whether these devices can prevent disembowelment, because disembowelment occurs so quickly, and it is difficult to determine exactly how much suction, and for what duration, the human body can tolerate vacuum without damage. See *The Great Entrapment Debate, Pool & Spa News* Pgs. 55, 56 (Aug. 18, 1999).

Although the currently available shut-off valves may prevent suction entrapments, they may be ineffectual in disembowelment accidents, because these occur in a fraction of a second. See *Pool & Spa News—Special Reports* Pg. 7 (1997).

SUMMARY OF THE INVENTION

Accordingly, it is an object of the present invention to provide an automatic shut-off valve which does not rely on an indication and control system, main drain pump shut-off, and subsequent release of vacuum at the main drain, along with the delay inherent in this scheme, to prevent dangerous vacuum build-up at the main drain. Design features allowing this object to be accomplished include an automatic shut-off valve installed at the main drain itself, which senses vacuum at the main drain itself, and which shuts off water flow at the main drain itself before vacuum at the main drain reaches dangerous levels. The automatic shut-off valve operates without having to shut off the main drain pump, and without having to wait until the main drain line vacuum dissipates, and thus provides main drain vacuum relief before main drain vacuum can reach dangerous levels. Advantages associated with the accomplishment of this object include prevention of disembowelment and suction-type entrapment incidents.

It is another object of the present invention to provide an automatic shut-off valve which provides a visual grate failure indication. Design features allowing this object to be accomplished include a ball having positive buoyancy which floats to the surface of the pool or hot tub if the grate becomes dislodged. A benefit associated with the accomplishment of this object is the provision of a warning to potential victims that the automatic shut-off valve requires servicing, before an accident can occur.

It is still another object of this invention to provide an automatic shut-off valve which incorporates a back-up function which blocks the main drain if the grate becomes dislodged and the positive buoyancy warning ball floats to the surface. Design features enabling the accomplishment of this object include a spring-loaded cap which automatically closes over the main drain in the event of grate failure and ball release. An advantage associated with the realization of this object is a back-up main drain shut-off function, and the associated increased reliability and safety advantages.

It is another object of the present invention to provide an automatic shut-off valve which is quickly and easily retrofittable to existing main drains. Design features allowing this object to be accomplished include a diaphragm attached to a diaphragm base, the diaphragm base incorporating a bolt pattern sized to fit a standard main drain threaded bore pattern. Benefits associated with the accomplishment of this object include reduced time and cost of installation, and thus increased availability.

It is still another object of this invention to provide an automatic shut-off valve which will not obstruct automatic pool cleaning equipment. Design features enabling the accomplishment of this object include a low profile diaphragm and diaphragm base, and either a diaphragm base ramp or an integral diaphragm and base ramp depending on the embodiment of the instant automatic shut-off valve. Advantages associated with the realization of this object include uninterrupted pool cleaning, along with the attendant health advantages.

BRIEF DESCRIPTION OF THE DRAWINGS

The invention, together with the other objects, features, aspects and advantages thereof will be more clearly understood from the following in conjunction with the accompanying drawings.

Five sheets of drawings are provided. Sheet one contains FIG. 1. Sheet two contains FIG. 2. Sheet three contains FIG. 3. Sheet four contains FIGS. 4 and 5. Sheet five contains FIGS. 6 and 7.

FIG. 2 is a side cross-sectional view of an automatic shut-off valve in the open position.

FIG. 3 is a side cross-sectional view of an automatic shut-off valve in the closed position.

FIG. 4 is a top view of an automatic shut-off valve.

FIG. 5 is a front cross-sectional view of an automatic shut-off valve in the open position.

FIG. 6 is a top view of an alternate embodiment automatic shut-off valve incorporating an integral diaphragm and base.

FIG. 7 is a front cross-sectional view of an alternate embodiment automatic shut-off valve incorporating an integral diaphragm and base.

DETAILED DESCRIPTION OF THE PREFERRED EMBODIMENT

Figure 1:
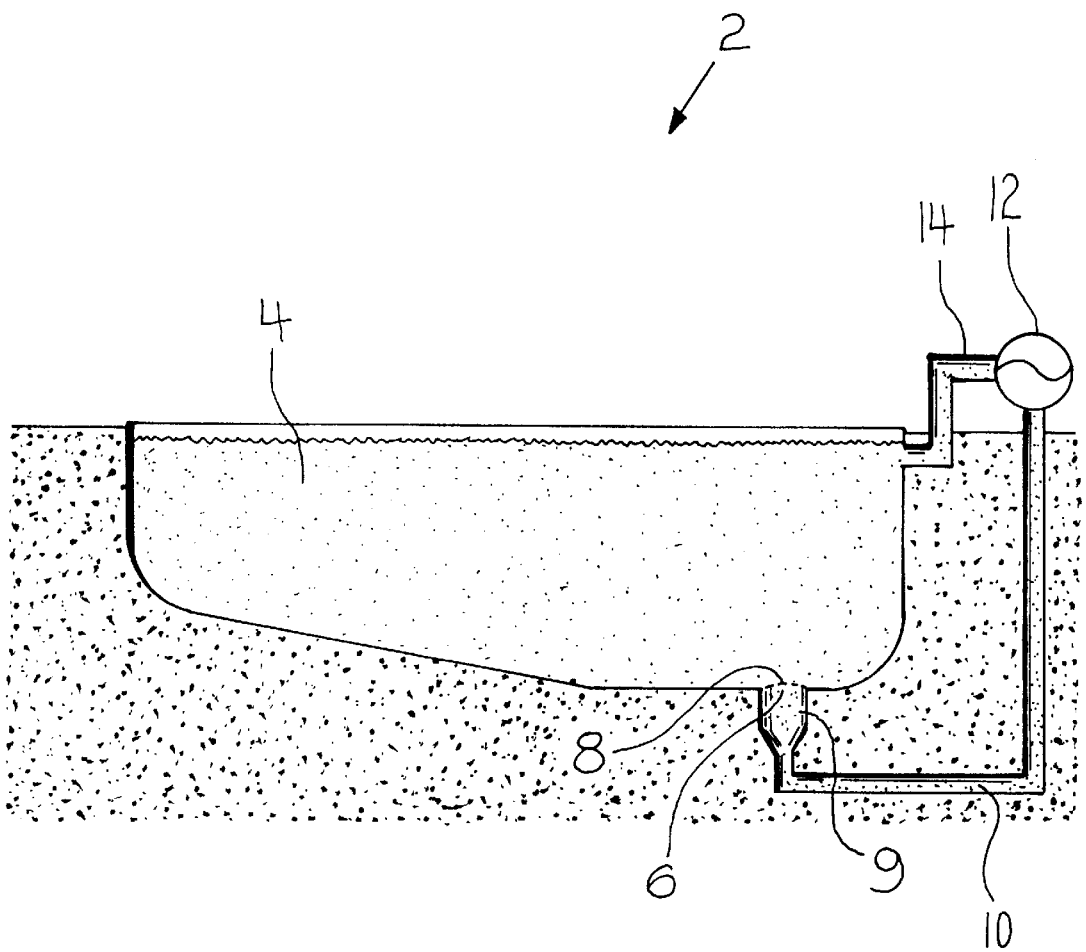
FIG. 1 is a side cross-sectional view of a typical pool water circulation system.

Referring now to FIGS. 2 and 3, we observe a side cross-sectional isometric view of automatic shut-off valve 20 in the open and closed positions, respectively. FIG. 4 is a top view of automatic shut-off valve 20, and FIG. 5 is a front cross-sectional isometric view of automatic shut-off valve 20 in the open position.

Automatic shut-off valve 20 comprises ball 42 sandwiched between diaphragm 30 and housing 36. Ball 42 is fabricated of material with positive buoyancy, or air-filled, so as to float if it escapes from the instant automatic shut-off valve 20. Thus, the buoyancy of ball 42 provides an important warning function: if ball 42 floats to the surface of a pool or spa into which automatic shut-off valve 20 has been installed, observers and swimmers will thereby receive notice that automatic shut-off valve 20 is in need of repair or maintenance.

Screws 28 through housing screw bores 54, fasten housing 36 to an existing sump lip 11. The instant automatic shut-off valve 20 may be retrofitted to existing sumps 9 using existing threaded bores in sump lip 11. Diaphragm 30 is attached at its diaphragm outer edge 32 to diaphragm base 22, at diaphragm base inner lip 26. Although the accompanying figures depict diaphragm 30 attached to diaphragm base 22 by means of diaphragm outer edge groove 33 around diaphragm outer edge 32, sized to admit diaphragm base inner lip 26, it is considered to be within the scope of this invention that any appropriate attachment means be used to attach diaphragm 30 to diaphragm base 22.

Diaphragm base 22 comprises diaphragm base ramp 29. Diaphragm base ramp 29 permits automatic pool cleaning apparatus to crawl over the instant automatic shut-off valve 20 without getting stuck.

Housing 36 comprises at least one housing threaded bore 37 sized to mate with a diaphragm base screw 25. Diaphragm base 22 comprises a diaphragm base screw bore 24 corresponding to each housing threaded bore 37. Diaphragm base 22 is held in place relative to housing 36 by means of a diaphragm base screw 25 extending through each diaphragm base screw bore 24 and threaded into a corresponding housing threaded bore 37.

Diaphragm base 22 also comprises diaphragm base apertures 23, which allow water to flow through diaphragm base 22. Diaphragm 30 comprises diaphragm actuator finger 31. One extreme of diaphragm actuator finger 31 is rigidly attached to diaphragm 30; an opposite extreme of diaphragm actuator finger 31 is disposed in close proximity to ball 42.

Diaphragm 30 is manufactured of resilient material which may be easily elastically deformed. When a force tending to elastically deform diaphragm 30 is removed, diaphragm 30 will tend to return to its original shape, which shape is illustrated in FIGS. 2 and 4.

Housing 36 comprises housing ball chamber 38 communicating with housing spring chamber 40 through valve seat 56. Housing spring chamber 40 communicates with sump 9 through at least one housing spring chamber aperture 41. Housing spring chamber 40 contains ball spring 46. When extended, ball spring 46 holds ball 42 out of valve seat 56, permitting water to flow between ball 42 and valve seat 56, and thence through housing spring chamber 40 and housing spring chamber apertures 41 into sump 9 and outflow pipe 10.

Housing ball chamber 38 comprises vanes 44 which in concert with cap 48 act as guides to constrain the motion of ball 42 to reciprocation substantially along a line from diaphragm actuator finger 31 through the center of ball spring 46. Thus when automatic shut-off valve 20 is in the open position depicted in FIGS. 2 and 4, ball 42 is held out contact with valve seat 56 by ball spring 46, constrained from floating upwards by diaphragm actuator finger 31, and held in place horizontally by vanes 44 and cap 48. Conversely, when automatic shut-off valve 20 is in the closed position depicted in FIG. 3, ball 42 is held in intimate contact with valve seat 56 by the differential water pressure above and below ball 42 against the force of ball spring 46, and held in place horizontally by valve seat 56.

In the open position of automatic shut-off valve 20 depicted in FIG. 2, water being recirculated flows through diaphragm base apertures 23, housing ball chamber 38, valve seat 56, housing spring chamber 40 and housing spring chamber aperture(s) 41 into sump 9 and outflow pipe 10, as indicated by arrows 51.

Operation of Automatic Shut-off Valve 20

If diaphragm base apertures 23 become partially or completely blocked (by a swimmer, for example), the water pressure differential between water above and below diaphragm 30 pushes diaphragm 30 downward as indicated by arrow 58 in FIG. 3. In turn, diaphragm actuator finger 31 rigidly attached to diaphragm 30 pushes ball 42 downwards towards valve seat 56, against the spring force of ball spring 46 and the resiliency of diaphragm 30.

When ball 42 is sufficiently close to valve seat 56, either diaphragm actuator finger 31 or the water pressure differential between water above and below ball 42 (or both) pushes ball 42 into intimate contact with valve seat 56, thereby stopping flow of water through automatic shut-off valve 20. The water pressure differential between water above and below ball 42 then holds ball 42 securely in valve seat 56 until the recirculation pump is turned off. Thus in operation, ball 42 acts as a surrogate swimmer: the main drain vacuum entraps ball 42 instead of the swimmer!

It is important to note that the closing action of automatic shut-off valve 20 occurs directly at main drain 6, within microseconds of any diaphragm base aperture 23 blockage sufficiently great to create a risk of bodily injury. The virtually instantaneous action of the instant automatic shut-off valve 20 represents a significant injury protection advance over existing in-line vacuum sensing valves, which may not close until injury has already occurred.

Once the recirculation pump is turned off, and the partial vacuum within sump 9 is relieved, the spring force of ball spring 46, the resiliency of diaphragm 30, and the buoyancy of ball 42 push diaphragm 30 back into the open position depicted in FIG. 2.

Alternate Embodiment

FIG. 6 is a top view of an alternate embodiment automatic shut-off valve 20 incorporating an integral diaphragm and base 64. FIG. 7 is a front cross-sectional view of the alternate embodiment automatic shut-off valve 20 incorporating an integral diaphragm and base 64.

The alternate embodiment automatic shut-off valve 20 depicted in FIGS. 6 and 7 incorporates an integral diaphragm and base 64, rather than a diaphragm 30 separate from diaphragm base 22.

Integral diaphragm and base 64 comprises an integral base 66 portion and an integral diaphragm 64 portion. Integral base 66 comprises integral diaphragm and base apertures 70, which serve the same function as the previously described diaphragm base apertures 23 in the preferred embodiment. Diaphragm actuator finger 31 is rigidly attached to integral diaphragm 65, and serves the same function as in the preferred embodiment.

The integral diaphragm 65 portion of integral diaphragm and base 64 is formed of resilient material as in diaphragm 30, and is intended to be able to easily elastically deform, and subsequently return to its original shape, also same as diaphragm 30 in the preferred embodiment. In this fashion, the alternate embodiment integral diaphragm 65 functions same as diaphragm 30 in the preferred embodiment. In contrast, the integral base 66 portion of integral diaphragm and base 64 is formed of stiffer material, and is not intended to deform appreciably during operation of the alternate embodiment automatic shut-off valve depicted in FIGS. 6 and 7. One way of achieving these different modes of operation for the integral diaphragm 65 portion vs. the integral base 66 portion would be to mold the entire integral diaphragm and base 65 in one piece, using a dual-durometer molding process.

Thus, the alternate embodiment automatic shut-off valve depicted in FIGS. 6 and 7 functions same as the preferred embodiment as explained above: if integral diaphragm and base apertures 70 become partially or completely blocked (by a swimmer, for example), the water pressure differential between water above and below integral diaphragm 65 pushes integral diaphragm 65 downward. In turn, diaphragm actuator finger 31 pushes ball 42 downwards towards valve seat 56, against the spring force of ball spring 46 and the resiliency of integral diaphragm 65.

When ball 42 is sufficiently close to valve seat 56, either diaphragm actuator finger 31 or the water pressure differential between water above and below ball 42 (or both) pushes ball 42 into intimate contact with valve seat 56, thereby stopping flow of water through automatic shut-off valve 20. The water pressure differential between water above and below ball 42 then holds ball 42 securely in valve seat 56 until the recirculation pump is turned off.

Although FIG. 7 depicts integral diaphragm and base 64 attached to housing 36 by means of at least one diaphragm base screw 24 through a corresponding integral diaphragm and base screw bore 69 and threaded into a corresponding housing screw bore 54, it is considered to be within the scope of this invention to use any appropriate means of attaching integral diaphragm and base 64 to housing 36. Integral diaphragm and base 64 may incorporate an integral diaphragm and base ramp 67 disposed around its outer edge, which as previously described, permits automatic pool cleaning apparatus to crawl over the instant automatic shut-off valve 20 without getting stuck.

In FIGS. 2–7 diaphragm base apertures 23 and integral diaphragm and base apertures 70 are depicted as being rectangular. It is important to note, however, that their shape may be any shape conducive to minimizing the restriction of water flow through them, including square or round.

Back-Up Main Drain Shut-Off Function

Figure 8:
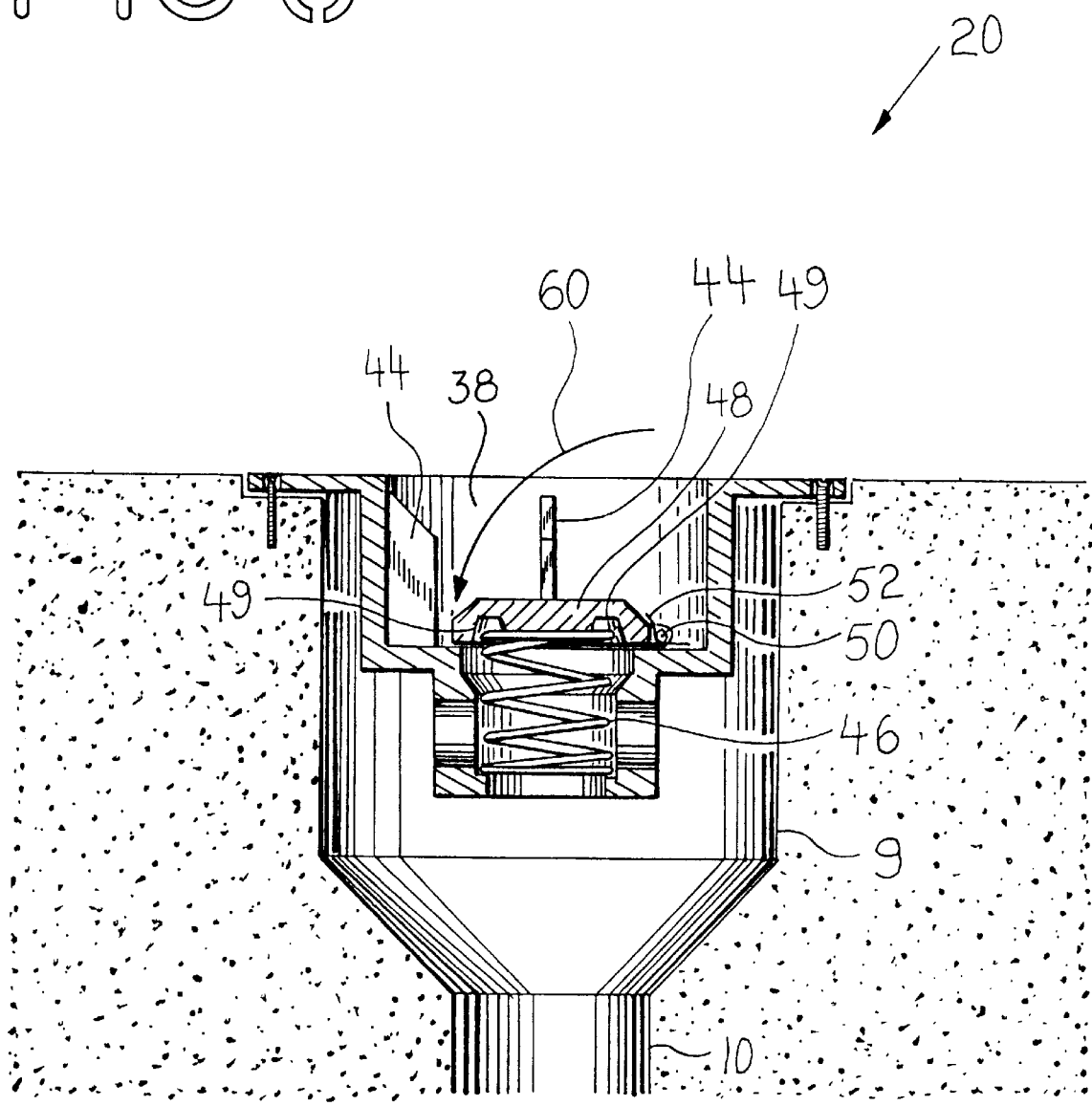
FIG. 8 is a side cross-sectional view of an automatic shut-off valve missing its ball and diaphragm base and diaphragm, or in the alternate embodiment automatic shut-off valve missing its ball and integral diaphragm and base, whose cap has therefore closed automatically as a backup flow shut-off device.

Referring now to FIG. 8, an important back-up main drain shut-off function is provided by cap 48. Cap 48 is sized to cover valve seat 56. Cap 48 also comprises cap groove 49, which is sized to admit the upper portion of ball spring 46, so as to avoid interference between ball spring 46 and cap 48 when the latter is in the closed position.

Cap 48 is hingedly attached to housing ball chamber 38 by means of cap hinge 50, and spring loaded into the closed position depicted in FIG. 8 by means of cap spring 52. Thus, if diaphragm 30 and ball 42 were to become dislodged, cap 42 would automatically close as urged by cap spring 52 and as indicated by arrow 60, thereby covering valve seat 56. When closed, cap 48 helps avoid the possibility that an individual could become trapped against main drain 6, or that an individual's hair could become entangled, because water flow has been blocked by cap 48.

FIG. 8 is a side cross-sectional view of automatic shut-off valve 20 missing its diaphragm 30, diaphragm base 22 (or in the alternate embodiment automatic shut-off valve 20 depicted in FIGS. 6 and 7, missing its integral diaphragm and base 64), and ball 42. As soon as ball 42 is no longer present to hold cap 48 open against the force of cap spring 52, cap spring 52 urges cap 48 closed over valve seat 56 as indicated by arrow 60. This closing of cap 48 interrupts any flow of water through automatic shut-off valve 20, and the water pressure differential between water above and below cap 48, and cap spring 52, then hold cap 48 securely closed until the recirculation pump is turned off. In addition, as previously described, ball 42 is designed to float, so if it became dislodged, ball 42 would float to the surface of a pool or spa into which automatic shut-off valve 20 had been installed, thereby providing observers and swimmers notice that automatic shut-off valve 20 is in need of repair or maintenance.

In the preferred and alternate embodiments, diaphragm 30, diaphragm base 22, integral diaphragm and base 64, housing 36, diaphragm actuator finger 31, cap 48 and screws 28 were manufactured of nylon, rubber, plastic, synthetic, metal, or other appropriate material. Ball spring 46 and cap spring were manufactured of metal, synthetic, or other appropriate material.

While a preferred embodiment of the invention has been illustrated herein, it is to be understood that changes and variations may be made by those skilled in the art without departing from the spirit of the appending claims.

DRAWING ITEM INDEX 2 pool
4 water
6 main drain
8 grate
9 sump
10 outflow pipe
11 sump lip
12 pump
14 inflow pipe
20 automatic shut-off valve
22 diaphragm base
23 diaphragm base aperture
24 diaphragm base screw bore
25 diaphragm base screw
26 diaphragm base inner lip
28 screw
29 diaphragm base ramp
30 diaphragm
31 diaphragm actuator finger
32 diaphragm outer edge
33 diaphragm outer edge groove
36 housing
37 housing threaded bore
38 housing ball chamber
40 housing spring chamber
41 housing spring chamber aperture
42 ball
44 vane
46 ball spring
48 cap
49 cap groove
50 cap hinge
51 arrow
52 cap spring
54 housing screw bore
56 valve seat
58 arrow
60 arrow
64 integral diaphragm and base
65 integral diaphragm
66 integral base
67 integral diaphragm and base ramp
69 integral diaphragm and base screw bore
70 integral diaphragm and base aperture

I claim:

1. An automatic shut-off valve comprising a ball and a ball spring disposed between a diaphragm and a housing, said diaphragm being made of resilient material, a diaphragm base attached to said diaphragm around an outer edge of said diaphragm, said diaphragm base comprising a plurality of diaphragm base apertures, said diaphragm base being attached to said housing, said housing comprising a housing ball chamber communicating with a housing spring chamber through a valve seat, said ball being sized to sealably seat in said valve seat when said automatic shut-off valve is in a closed position, said ball being disposed substantially within said ball chamber, said ball spring being disposed substantially within said spring chamber, said ball spring urging said ball out of contact with said valve seat, said housing further comprising at least one housing spring chamber aperture through which said spring chamber communicates with an exterior of said housing spring chamber.

2. The automatic shut-off valve of claim 1 wherein said ball is made of material with positive buoyancy.

3. The automatic shut-off valve of claim 2 wherein said diaphragm further comprises a diaphragm actuator finger, one extreme of said diaphragm actuator finger being rigidly attached to said diaphragm, the positive buoyancy of said ball urging said ball against an extreme of said actuator finger opposite said diaphragm.

4. The automatic shut-off valve of claim 1 wherein said diaphragm base further comprises a diaphragm base ramp disposed around its perimeter, whereby automatic pool cleaning apparatus may crawl over said automatic shut-off valve without getting stuck.

5. The automatic shut-off valve of claim 1 wherein said housing ball chamber further comprises a plurality of vanes rigidly attached to its wall and extending substantially perpendicular to its wall, whereby a horizontal position of said ball may be limited to a position substantially over said valve seat, said ball remaining free to reciprocate vertically.

6. The automatic shut-off valve of claim 1 wherein said automatic shut-off valve further comprises a cap hingedly attached to said housing ball chamber by means of a cap hinge, said cap when closed blocking said valve seat, said cap when open resting against an inside wall of said housing ball chamber, said cap being spring-loaded by means of a cap spring into a closed position covering said valve seat.

7. The automatic shut-off valve of claim 6 wherein said cap further comprises a cap groove sized to admit an upper portion of said ball spring when said cap is in a closed position covering said valve seat, whereby said cap may close completely over said valve seat without interference from said ball spring.

8. The automatic shut-off valve of claim 1 wherein said diaphragm is attached to said diaphragm base by means of a diaphragm outer edge groove disposed along the outer edge of said diaphragm, said diaphragm outer edge groove being sized to admit a diaphragm base inner lip, said diaphragm base inner lip being disposed within said diaphragm outer edge groove.

9. The automatic shut-off valve of claim 8 wherein said diaphragm base is attached to said housing by means of at least one diaphragm base screw extending through a corresponding diaphragm base screw bore and threaded into a corresponding housing threaded bore.

10. An alternate embodiment automatic shut-off valve comprising a ball and a ball spring disposed between an integral diaphragm and base, and a housing, said integral diaphragm and base comprising a centrally-disposed integral diaphragm portion and a perimetrically-disposed integral base portion, said integral diaphragm portion being made of resilient material, at least one integral diaphragm and base aperture disposed in said integral base portion, said integral base portion being attached to said housing, said housing comprising a housing ball chamber communicating with a housing spring chamber through a valve seat, said ball being sized to sealably seat in said valve seat when said automatic shut-off valve is in a closed position, said ball being disposed substantially within said ball chamber, said ball spring being disposed substantially within said spring chamber, said ball spring urging said ball out of contact with said valve seat, said housing further comprising at least one housing spring chamber aperture through which said spring chamber communicates with an exterior of said housing spring chamber.

11. The automatic shut-off valve of claim 10 wherein said ball is made of material with positive buoyancy.

12. The automatic shut-off valve of claim 11 wherein said integral diaphragm portion further comprises a diaphragm actuator finger, one extreme of said diaphragm actuator finger being rigidly attached to said integral diaphragm portion, the positive buoyancy of said ball urging said ball against an extreme of said actuator finger opposite said integral diaphragm portion.

13. The automatic shut-off valve of claim 10 wherein said integral diaphragm base portion further comprises an integral diaphragm and base ramp disposed around its perimeter, whereby automatic pool cleaning apparatus may crawl over said automatic shut-off valve without getting stuck.

14. The automatic shut-off valve of claim 10 wherein said housing ball chamber further comprises a plurality of vanes rigidly attached to its wall and extending substantially perpendicular to its wall, whereby a horizontal position of said ball may be limited to a position substantially over said valve seat, said ball remaining free to reciprocate vertically.

15. The automatic shut-off valve of claim 10 wherein said automatic shut-off valve further comprises a cap hingedly attached to said housing ball chamber by means of a cap hinge, said cap when closed blocking said valve seat, said cap when open resting against an inside wall of said housing ball chamber, said cap being spring-loaded by means of a cap spring into a closed position covering said valve seat.

16. The automatic shut-off valve of claim 15 wherein said cap further comprises a cap groove sized to admit an upper portion of said ball spring when said cap is in a closed position covering said valve seat, whereby said cap may close completely over said valve seat without interference from said ball spring.

17. The automatic shut-off valve of claim 10 wherein said integral diaphragm and base is attached to said housing by means of at least one diaphragm base screw extending through a corresponding integral diaphragm and base screw bore and threaded into a corresponding housing threaded bore.

18. The automatic shut-off valve of claim 10 wherein said integral diaphragm and base is molded in one piece using a dual-durometer molding process.

* * * * *